(12) United States Patent
Felix

(10) Patent No.: US 10,814,787 B2
(45) Date of Patent: Oct. 27, 2020

(54) SIDE-VIEW MIRROR MOUNTED BIRD DETERRENT SYSTEM

(71) Applicant: Marinus Felix, La Fargue (LC)

(72) Inventor: Marinus Felix, La Fargue (LC)

( * ) Notice: Subject to any disclaimer, the term of this patent is extended or adjusted under 35 U.S.C. 154(b) by 351 days.

(21) Appl. No.: 15/909,792

(22) Filed: Mar. 1, 2018

(65) Prior Publication Data
US 2018/0251068 A1    Sep. 6, 2018

Related U.S. Application Data

(60) Provisional application No. 62/465,391, filed on Mar. 1, 2017.

(51) Int. Cl.
| B60R 1/12 | (2006.01) |
| A01M 29/26 | (2011.01) |
| B60R 1/06 | (2006.01) |
| B60R 1/00 | (2006.01) |

(52) U.S. Cl.
CPC ............... *B60R 1/12* (2013.01); *A01M 29/26* (2013.01); *B60R 1/006* (2013.01); *B60R 1/06* (2013.01); *B60R 2001/1223* (2013.01)

(58) Field of Classification Search
CPC .. B60R 1/12; B60R 1/006; B60R 1/06; B60R 2001/1223; A01M 29/26
See application file for complete search history.

(56) References Cited

U.S. PATENT DOCUMENTS

| 6,371,054 B1* | 4/2002 | Celata | A01K 15/023 |
| | | | 119/712 |
| 2009/0309738 A1* | 12/2009 | Hinkle | A01M 31/002 |
| | | | 340/573.3 |
| 2013/0094154 A1* | 4/2013 | Shen | H01R 13/502 |
| | | | 361/731 |
| 2014/0328000 A1* | 11/2014 | Riddell | A01M 29/26 |
| | | | 361/232 |
| 2016/0324138 A1* | 11/2016 | Lafser | A01M 29/22 |

* cited by examiner

*Primary Examiner* — Scott Bauer

(57) ABSTRACT

The vehicle-sider rear-view mirror mounted bird deterrent system delivers an electric shock to scare birds away. The bird deterrent system includes a shock strip, a sensor, a microcontroller, a power source, and a vehicle-side rear-view mirror. The vehicle-side rear-view mirror can be any rear-view mirror of a commercial or passenger vehicle. The shock strip is a thin flexible strip that attaches onto an exterior face of the vehicle-side rear-view mirror. The shock strip is positioned along the side rear-view mirror and covers most of the flat surface which the bird is likely to stand on. The sensor is operatively connected to the shock strip, wherein the sensor transmits a signal to the microcontroller when it detects a bird standing on the shock strip. The microcontroller completes a circuit between the power source and the shock strip, thereby creating a flow of electrical current capable of delivering an electrical shock.

14 Claims, 15 Drawing Sheets

SIDE-VIEW MIRROR MOUNTED BIRD DETERRENT SYSTEM

The current application claims a priority to the U.S. Provisional Patent application Ser. No. 62/465,391 filed on Mar. 1, 2017.

FIELD OF THE INVENTION

The present invention generally relates to a bird deterrent system. More specifically, the present invention is a side-view mirror mounted bird deterrent system that can deliver an electric shock to prevent a bird from standing on the vehicle-side rear-view mirror.

BACKGROUND OF THE INVENTION

Birds are prone to landing and perching on a vehicle's side rear-view mirror where they can also defecate. Unfortunately, owners may spend excessive amount of time cleaning these mirrors, not only wasting their time but also water, cleaner, and various chemicals, which may weaken the paint. Birds may also scratch the mirror housing and paint with their claws, instantly depreciating the car's value. In order to address these concerns, the present invention provides a side-view mirror mounted bird deterrent system that detects when a bird lands on the vehicle-side rear-view mirror and delivers a mild shock to prevent the bird from remaining on the door mirror.

As a result, the present invention prevents pesky birds from perching on a parked vehicle's side-view mirrors. By deterring birds from perching on the vehicle the present invention eliminates unsightly scratches on vehicle mirrors, the car's value and its overall appearance is preserved. This also preserves a car's paint job and prevents birds from bumping or moving side mirrors, thereby saving drivers time and frustration constantly washing their car.

SUMMARY OF THE INVENTION

The present invention provides a safe and convenient way to keep birds from sitting on the vehicle-side rear-view mirrors. The preferred embodiment of the present invention may comprise a shock strip that is electrically connected to a power source. The power source is preferably rechargeable battery that can be charged via a mini-solar panel or a vehicle's 12-volt battery system. The power source is connected to a microcontroller which is electronically connected to a sensor. The motion sensor can detect a bird on a vehicle's side-view mirror. The shock strip comprises a metal contact made of a thin conductive strip of metal or other suitable material. The metal contact is mounted on top of a substrate of the shock strip that is adhered onto the frame of the vehicle-side rear-view mirror. The shock strip preferably is available in rolls that can be unrolled and attached to the top of a car's side-view mirror, or wherever pesky birds prefer to perch. The shock strip can be cut to the desired length as needed.

DETAILED DESCRIPTION OF THE INVENTION

All illustrations of the drawings are for the purpose of describing selected versions of the present invention and are not intended to limit the scope of the present invention.

Figure 1:
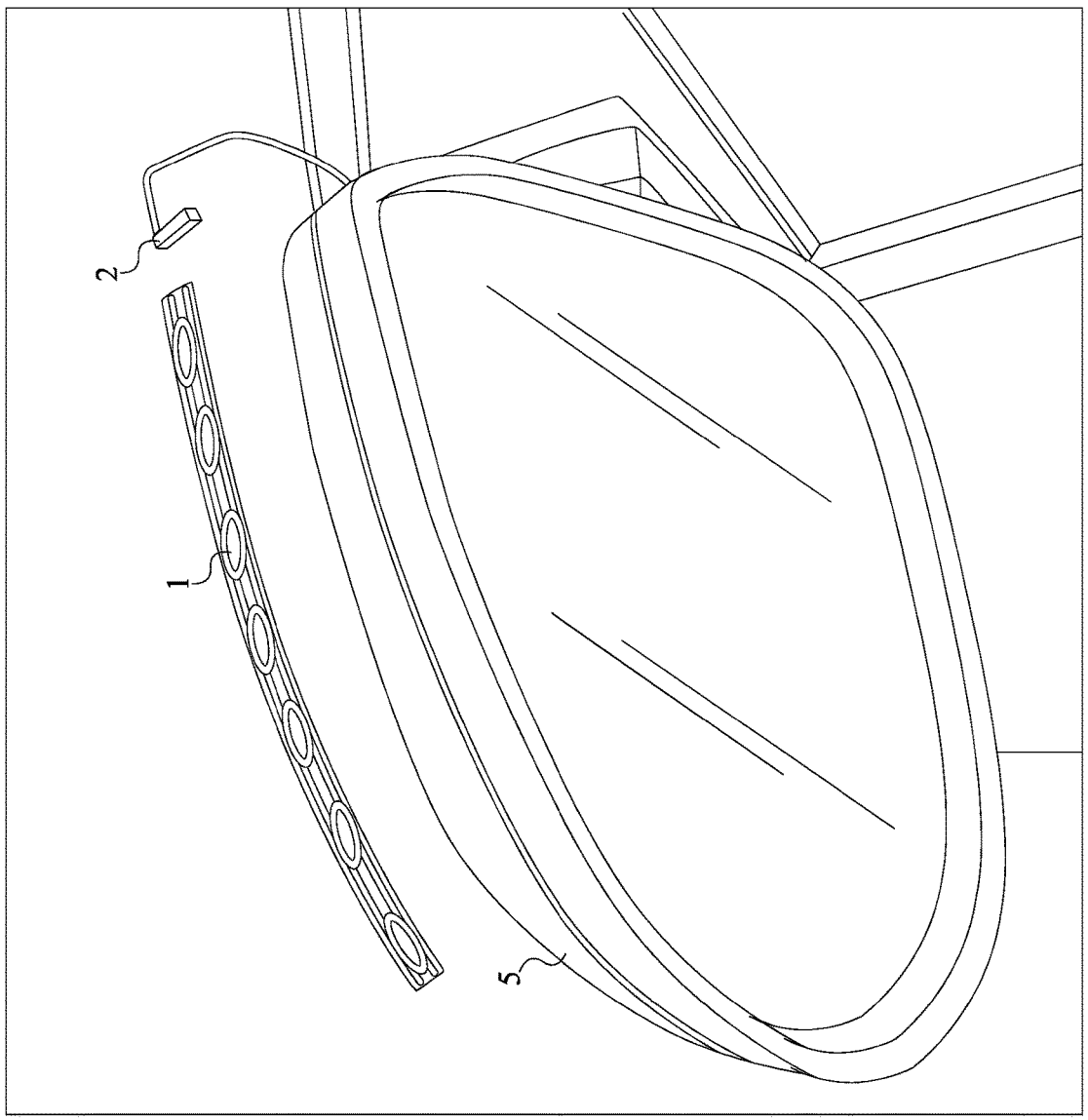
FIG. 1 is an exploded view showing the shock strip suspended over the vehicle-side rear-view mirror.

Referring to FIG. 1, the present invention is a vehicle-side rear-view mirror 5 mounted bird deterrent system that prevents birds from defecating and damaging the vehicle. More specifically, the present invention delivers a mild electric shock to deter the bird from landing or perching on the vehicle-side rear-view mirror.

Figure 2:
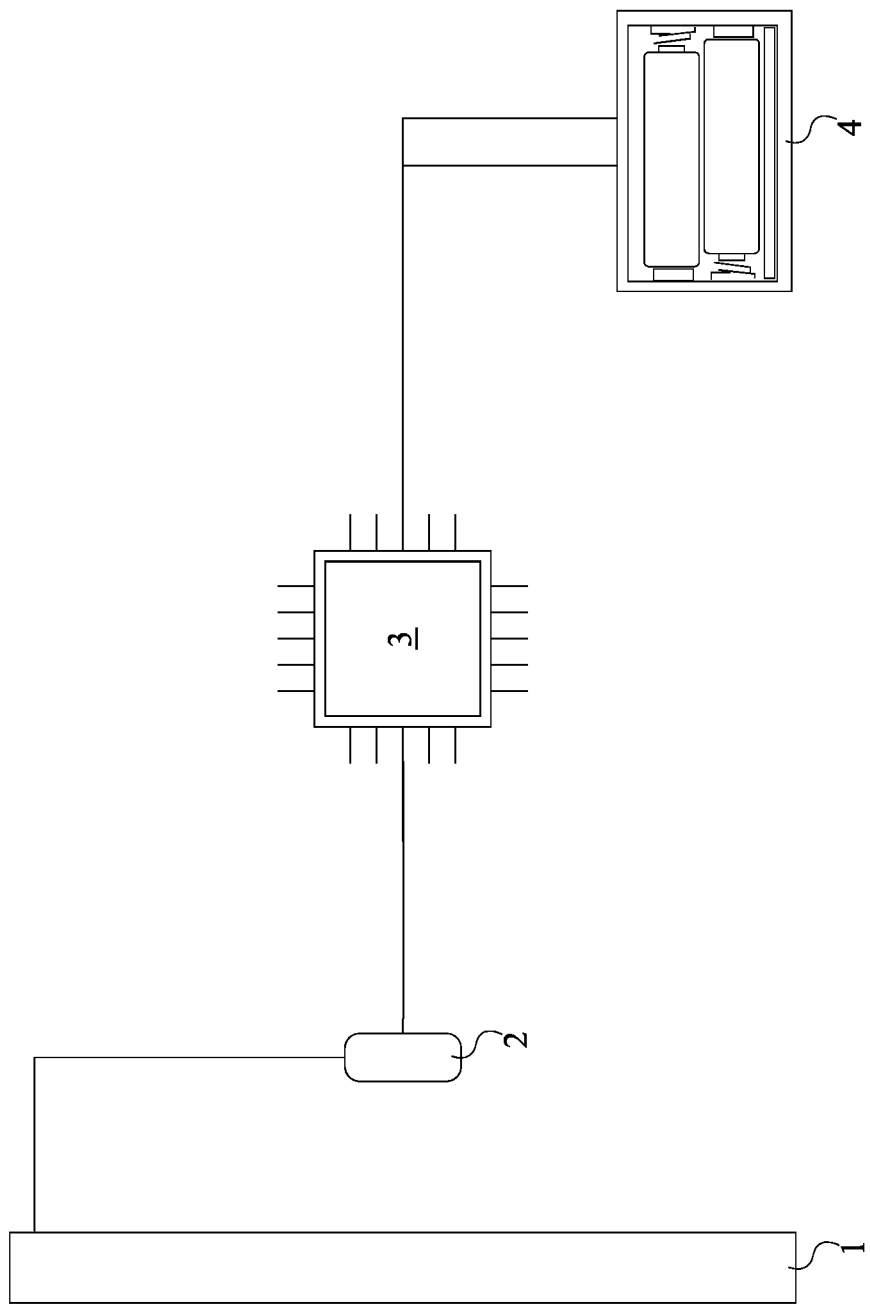
FIG. 2 is a schematic showing the electronic connections.
Figure 3:
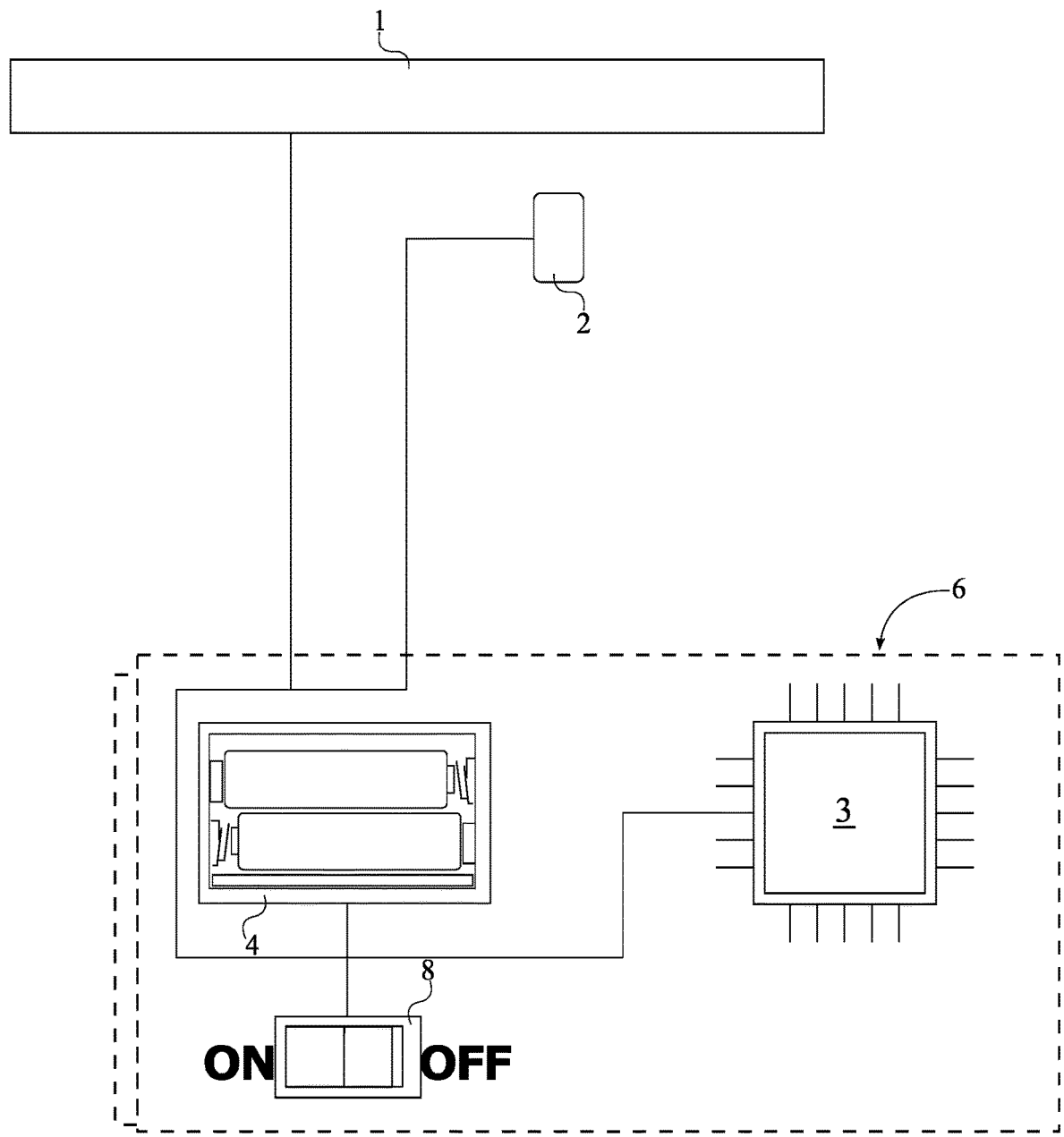
FIG. 3 is a schematic showing the electrical connections.

Referring to FIG. 1, FIG. 2, and FIG. 3, the preferred embodiment of the side-view mirror mounted bird deterrent system comprises a shock strip 1, a sensor 2, a microcontroller 3, a power source 4, and a vehicle-side rear-view mirror 5. The vehicle-side rear-view mirror 5 refers to a side rear-view mirror of a passenger or a commercial vehicle, such as a car, a sports utility vehicle (SUV), or a truck. The shock strip 1 is a flexible tape that attaches to the exterior surface of the vehicle-side rear-view mirror 5. The sensor 2 is operatively connected to the shock strip 1 to transmit signals to the microcontroller 3. More specifically, the sensor 2 is adjacently connected onto the shock strip 1. The shock strip 1 is externally connected onto a frame 51 of the side rear-view mirror 5. More specifically, the shock strip 1 is attached on top of the frame 51. The microcontroller 3 controls electrical transmission between the shock strip 1 and the power source 4. As such, the shock strip 1, the sensor 2, and the microcontroller 3 are electrically connected to the power source 4. The sensor 2 and the power source 4 are electronically connected to the microcontroller 3, wherein the sensor 2 transmits a signal to the microcontroller 3 when a bird is present within the vicinity of the shock strip 1. In particular, when a bird strays close to the shock strip 1, the sensor 2 transmits a signal to the microcontroller 3 which is programmed to complete an electrical circuit between the shock strip 1 and the power source 4. As a result, the shock strip 1 delivers an electric shock that causes the bird to fly away from the vehicle-side rear-view mirror 5.

Figure 4:
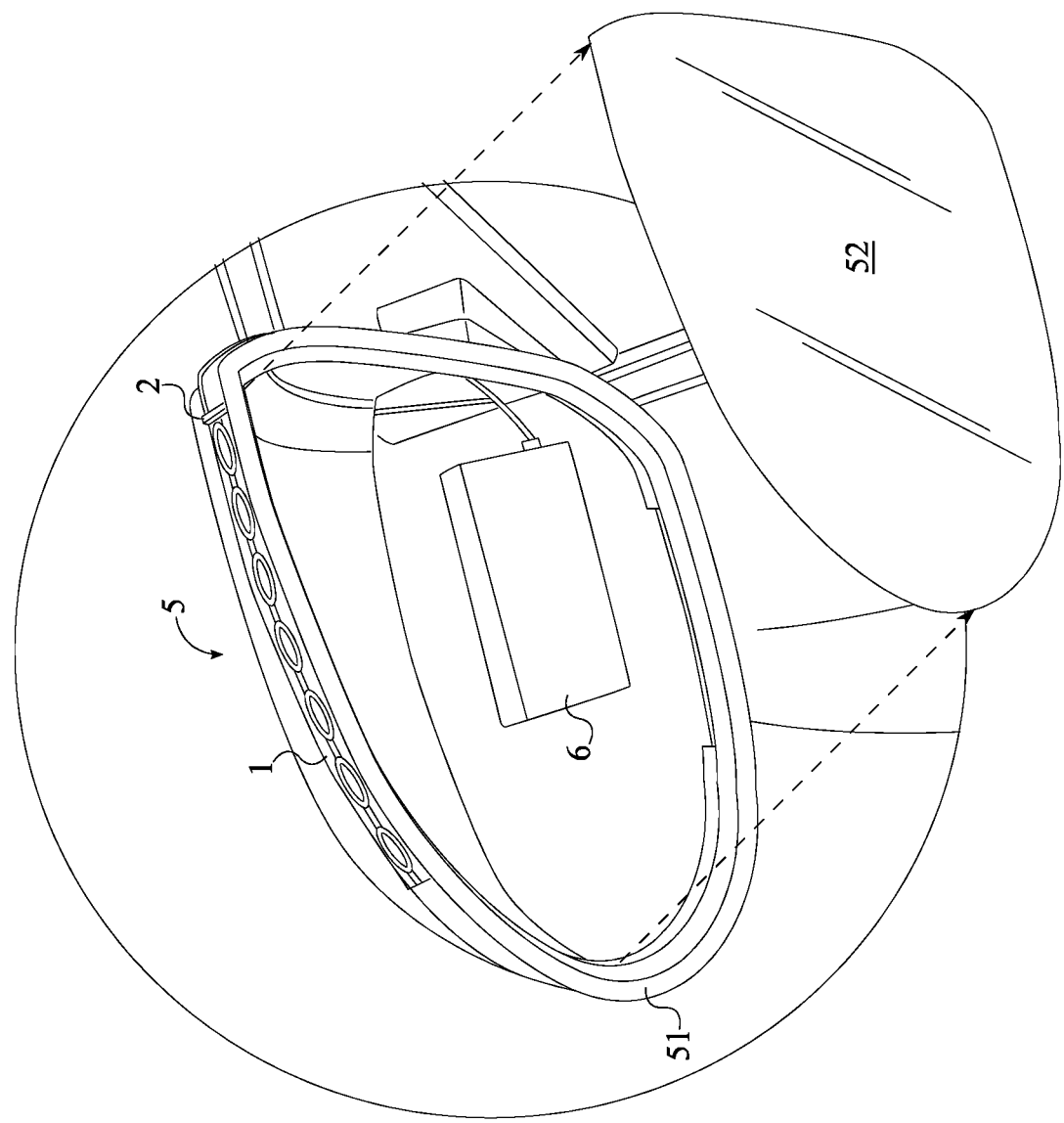
FIG. 4 is a perspective view showing the hosing positioned within the vehicle-side rear-view mirror.

Referring to FIG. 4, in the preferred implementation of the present invention, the shock strip 1 is attached onto an exterior face of the vehicle-side rear-view mirror 5. As such, the vehicle-side rear-view mirror 5 further comprises a mirror 52 which is mounted within the frame 51. More specifically, the frame 51 perimetrically encloses the mirror 52 of the vehicle-side rear-view mirror 5. The preferred frame 51 is a hollow panel that is elliptical in shape. The shock strip 1 must therefore flex and bend to conform to the curved surface on top of the frame 51.

Figure 5:
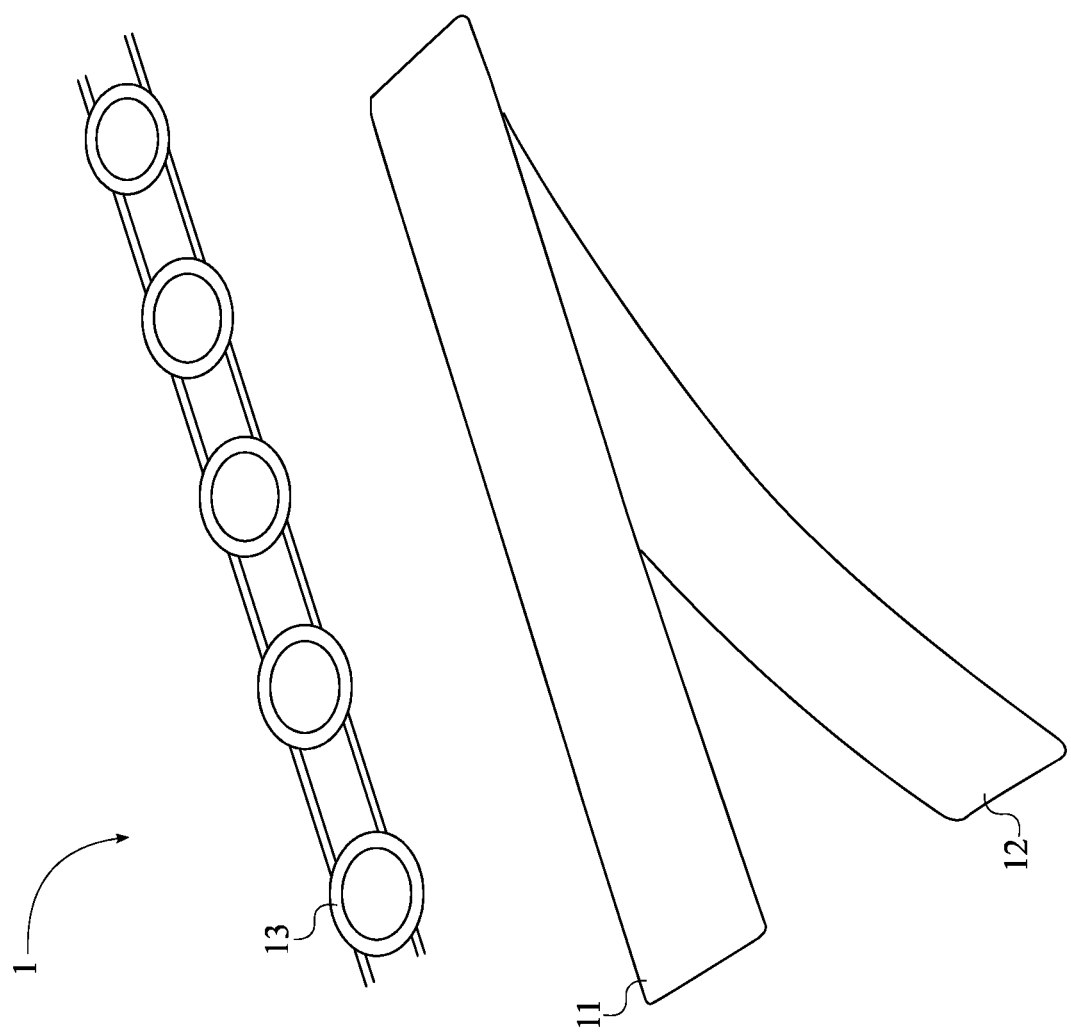
FIG. 5 is an exploded view of the shock strip.

Referring to FIG. 5, the preferred embodiment of the shock strip 1 comprises a substrate 11, an adhesive strip 12, and a metal contact 13. The substrate 11 is preferably a thin, flexible plastic strip capable of attaching to curved surfaces. The metal contact 13 is a thin metal strip made of copper, aluminum, or a similarly conductive material capable of bending and flexing along the substrate 11. The metal contact 13 is adjacently connected onto the substrate 11. The adhesive strip 12 allows the substrate 11 to attach onto the exterior face of the frame 51. As such, the adhesive strip 12 is connected adjacent to the substrate 11, opposite of the metal contact 13. Preferably, the substrate 11 is also attached to the frame 51 by the adhesive strip 12. More specifically, the shock strip 1 is attached to the frame 51 with the metal contact 13 facing upward and the adhesive strip 12 positioned coincident to the exterior face of the frame 51. To maximize the surface area covered by the shock strip 1, the substrate 11 is positioned along the vehicle-side rear-view mirror 5. This is because birds are most likely to land along the frame 51 which presents a long flat surface. Thus, positioning the substrate 11 along the mirror 5 covers most of the area on which a bird can land.

Figure 6:
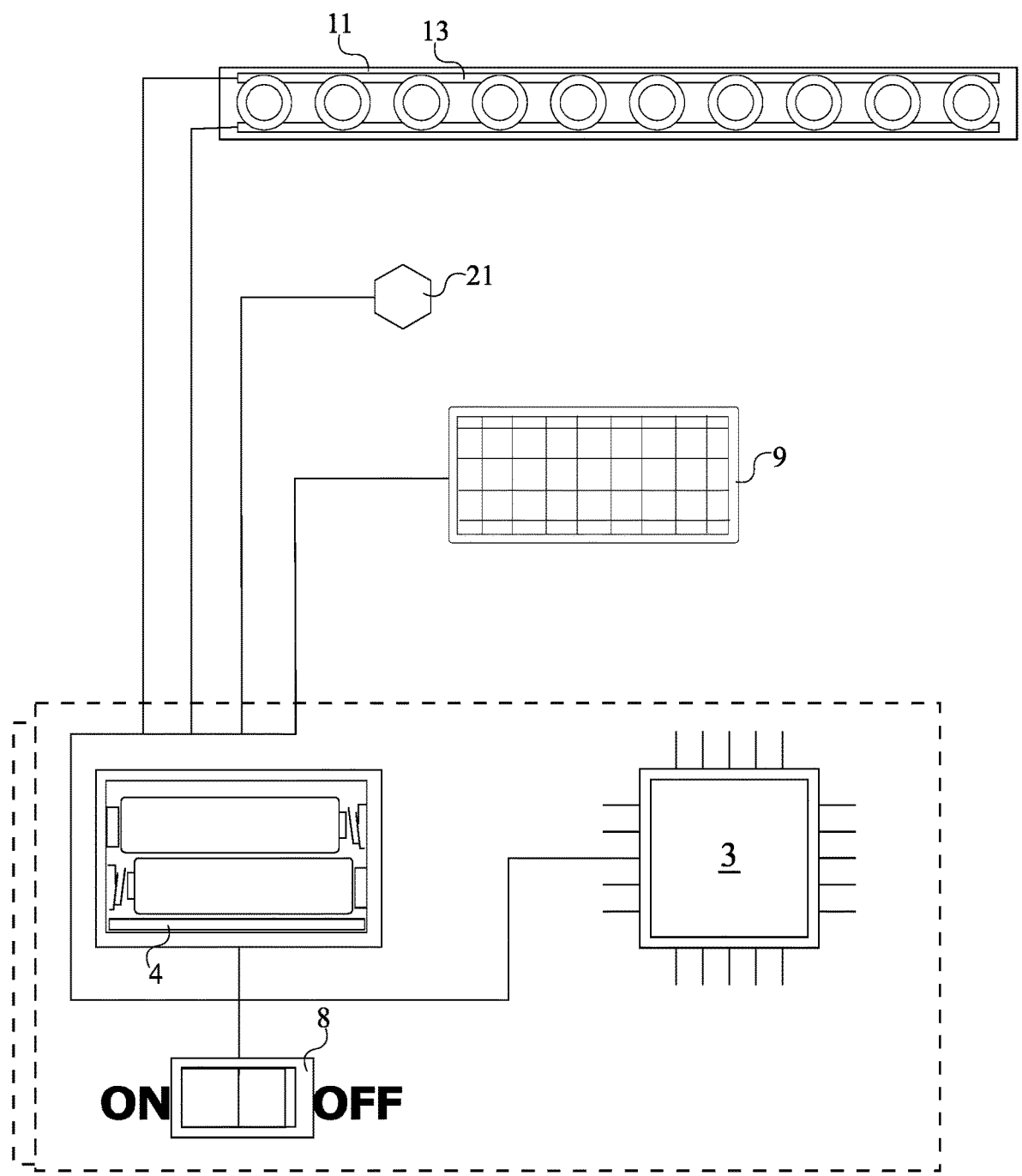
FIG. 6 is a schematic showing the electrical connections between the power source, the metal contact, the motion sensor, and the solar panel.

Referring to FIG. 6, in the preferred embodiment of the present invention, the metal contact 13 is electrically connected to the power source 4. More specifically, a negative terminal and a positive terminal of the power source 4 is electrically connected to the metal contact 13. The difference in charge between the positive terminal and negative terminal generates an electrical current within the metal contact 13. When a bird lands on top of the shock strip 1, the body of the bird acts as the ground wherein the current directly flows into. The sudden flow of electrical current into the body of the bird delivers an electric shock. The electrical connection between the power source 4 and the metal contact 13 is controlled by the microcontroller 3. Preferably, the microcontroller 3 uses a switch to make or break the electrical circuit between the power source 4 and the metal contact 13. The switch may control electrical connection of either the positive terminal of the power source 4 or the negative terminal of the power source 4. When the bird lands on the metal contact 13, the sensor 2 sends signals to the microcontroller 3 which closes the switch and allows the flow of current to the metal contact 13.

Figure 7:
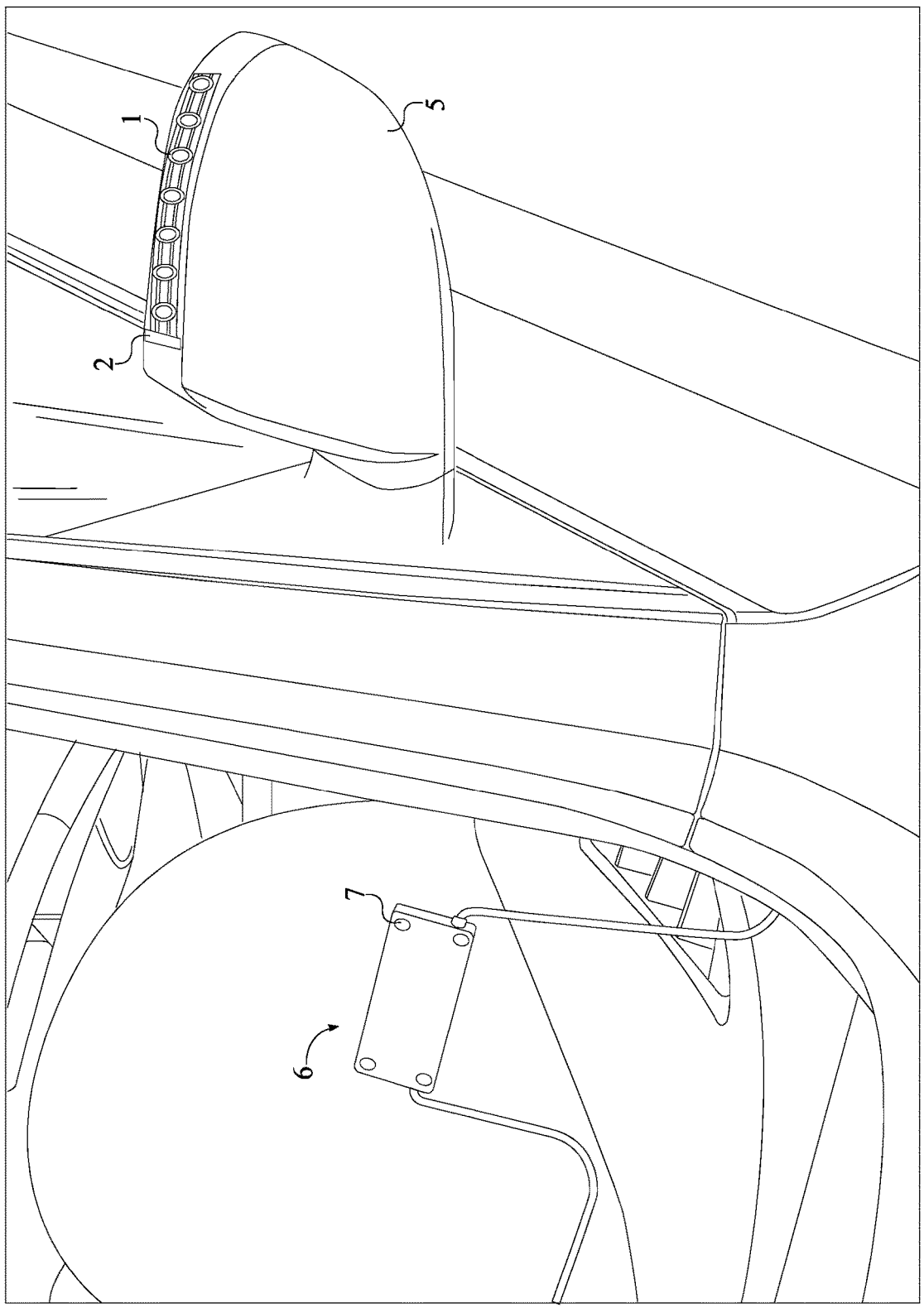
FIG. 7 shows the housing mounted onto the windshield of the vehicle.
Figure 8:
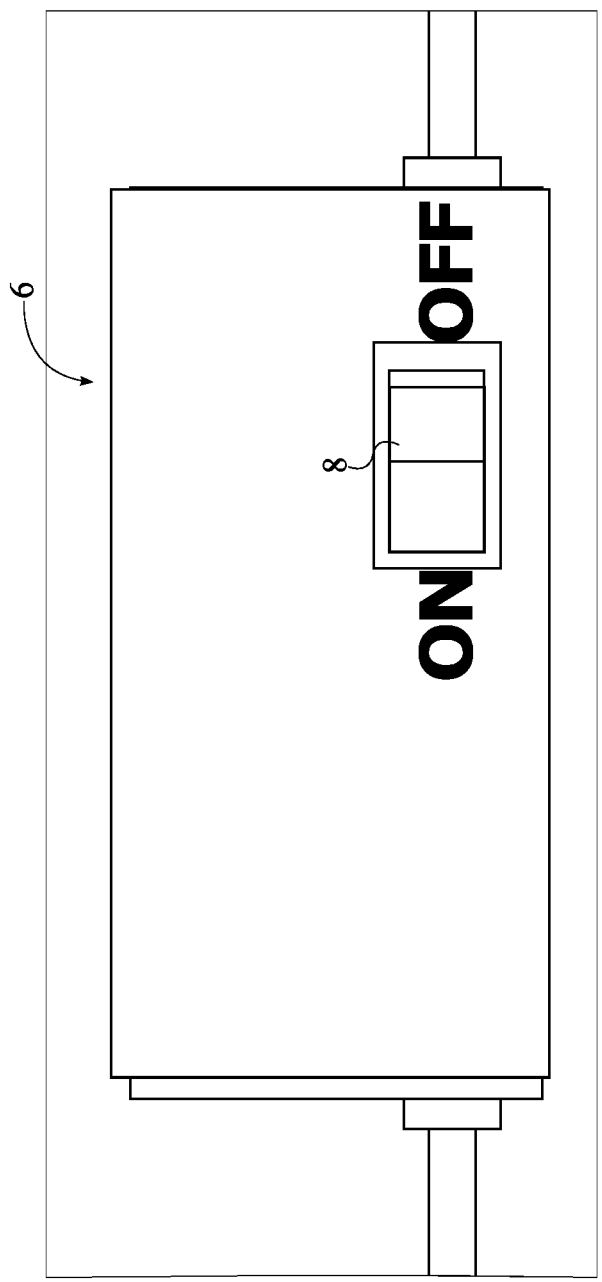
FIG. 8 shows the power button of the housing.

Referring to FIG. 6-8, in the preferred embodiment of the present invention further comprises a housing 6, a power button 8, and a fastening mechanism 7. The housing 6 protects the microcontroller 3 and the power source 4 from environmental elements such as moisture. The fastening mechanism 7 helps attach the housing 6 to the windshield of a vehicle. The power button 8 disconnects the power source 4 from the shock strip 1, enabling a user to handle the shock strip 1 without getting shocked. The power source 4 is positioned within the housing 6. More specifically, the power source 4 is housed within a battery chamber and covered with a removable panel. Further, the power button 8 is integrated into the housing 6. Preferably, the power button 8 is a toggle switch mounted onto a side of the housing 6. This positions the power button 8 on an accessible place that can be easily reached when the present invention is mounted onto the windshield. The fastening mechanism 7 is laterally connected onto the housing 6, opposite the power button 8. In some embodiments of the present invention, the fastening mechanism 7 may be a suction cup or an adhesive tape capable of bonding with a flat or curved surface.

Referring to FIG. 4, alternately, the housing 6 may be positioned inside the frame 51 of the vehicle-side rear-view mirror 5. A gap between the frame 51 and the mirror 52 allows wires to establish electrical and electronic connection between the microcontroller 3, the power source 4, the sensor 2, and the shock strip 1. In this embodiment, the power button 8 and the power source 4 must be positioned out of the housing 6. For example, the power button 8 and the power source 4 may be mounted in the cabin of the vehicle to allow access to the user.

Referring to back FIG. 3, focusing on the power button 8, the power button 8 is electrically connected to the power source 4, wherein the power button 8 breaks the electrical connection from the power source 4 to the shock strip 1, the microcontroller 3, and the sensor 2. This allows the user to handle and move the shock strip 1 without getting shocked. Alternately, the power button 8 may only disconnect the electrical connection between the power source 4 and the shock strip 1, while continuously maintaining the electrical connection to the microcontroller 3 and the sensor 2. The preferred power source 4 is a 3-volt rechargeable battery cell positioned within the housing 6.

Figure 9:
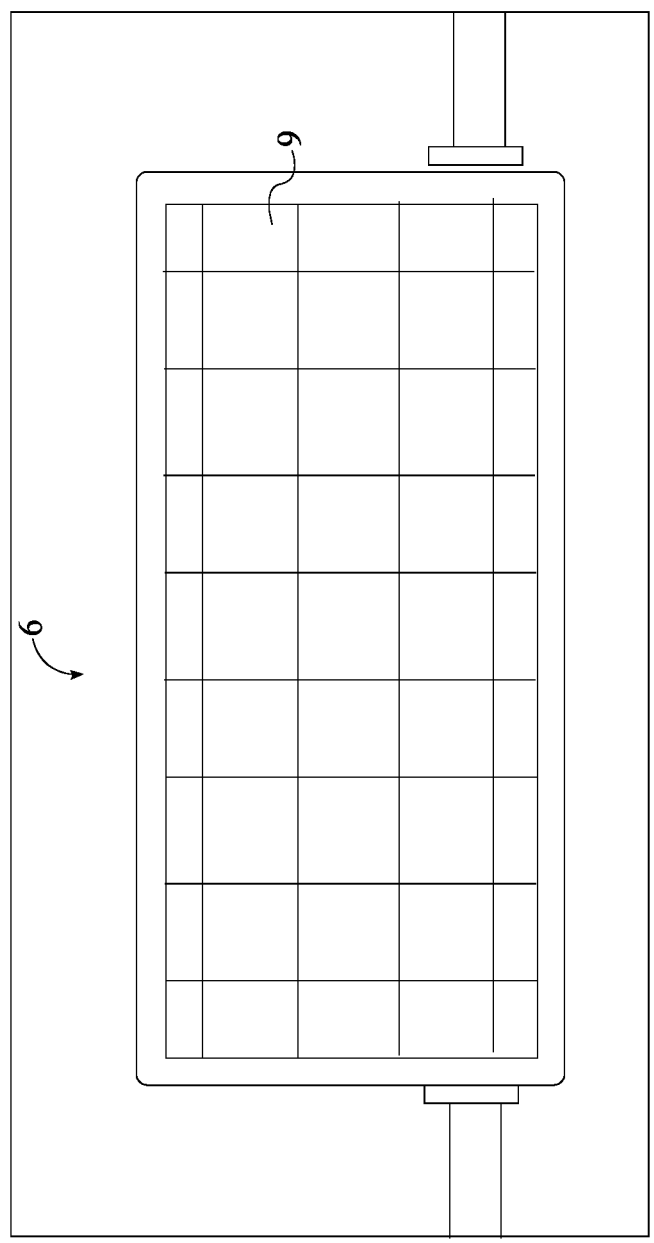
FIG. 9 shows the solar panel mounted connected to the housing.
Figure 10:
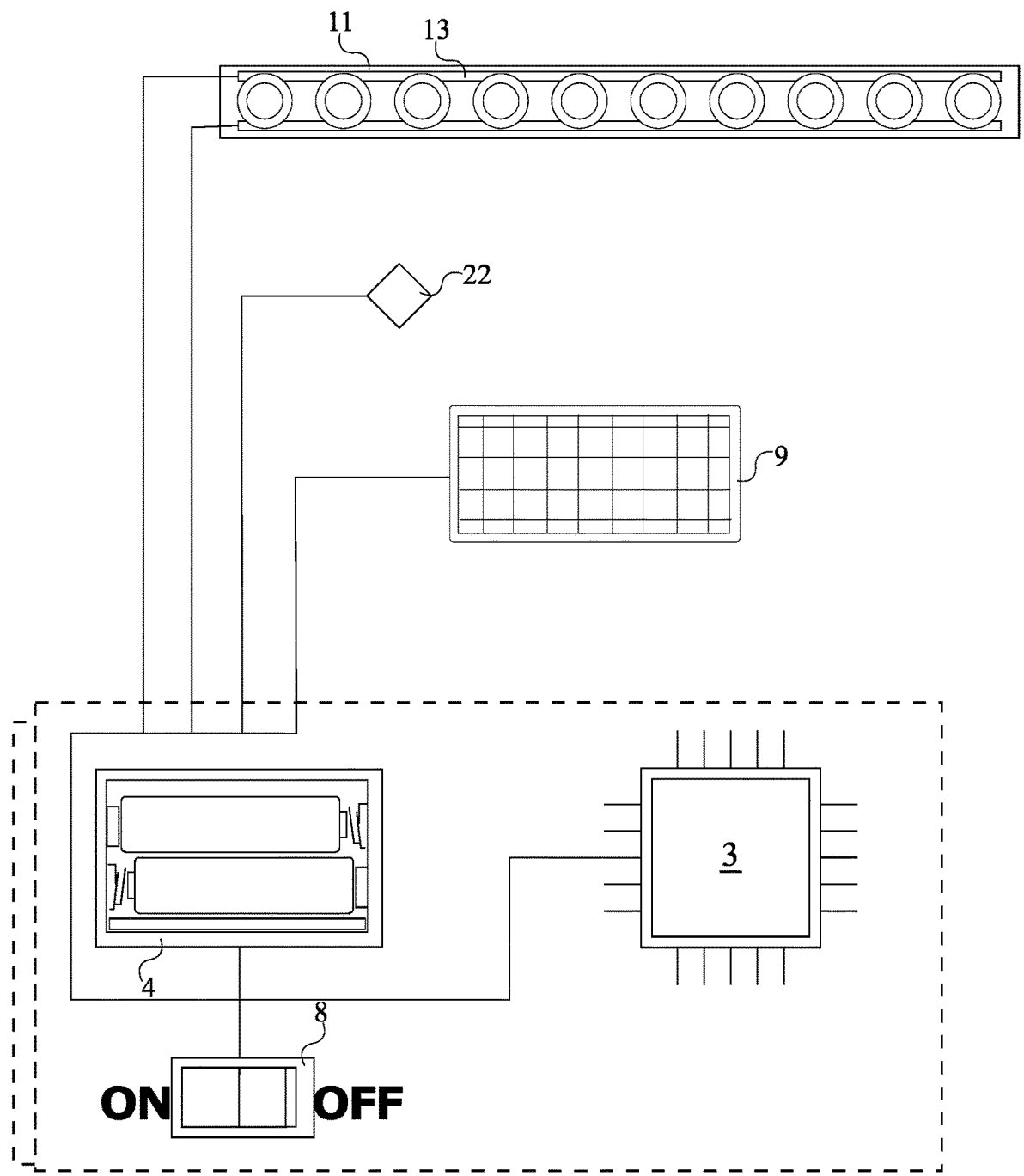
FIG. 10 is a schematic showing the electrical connections between the power source, the metal contact, the weight sensor, and the solar panel.

Referring to FIG. 9-10, the preferred embodiment of the present invention further comprises a solar panel 9. The solar panel 9 is preferably connected onto the housing, opposite the power button 8. The solar panel 9 recharges the power source 4 when the shock strip 1 is kept in idle. The power source 4 utilizes a 3-volt rechargeable battery cell. As such, the solar panel 9 is electrically connected to the power source 4. Further, the solar panel 9 may be electronically connected to the microcontroller 3 to selectively connect the solar panel 9 into the power source 4. For example, the power source 4 is only charged after the power source 4 discharges into the metal contact 13. This obviates the need to change or replace the battery cell.

Figure 11:
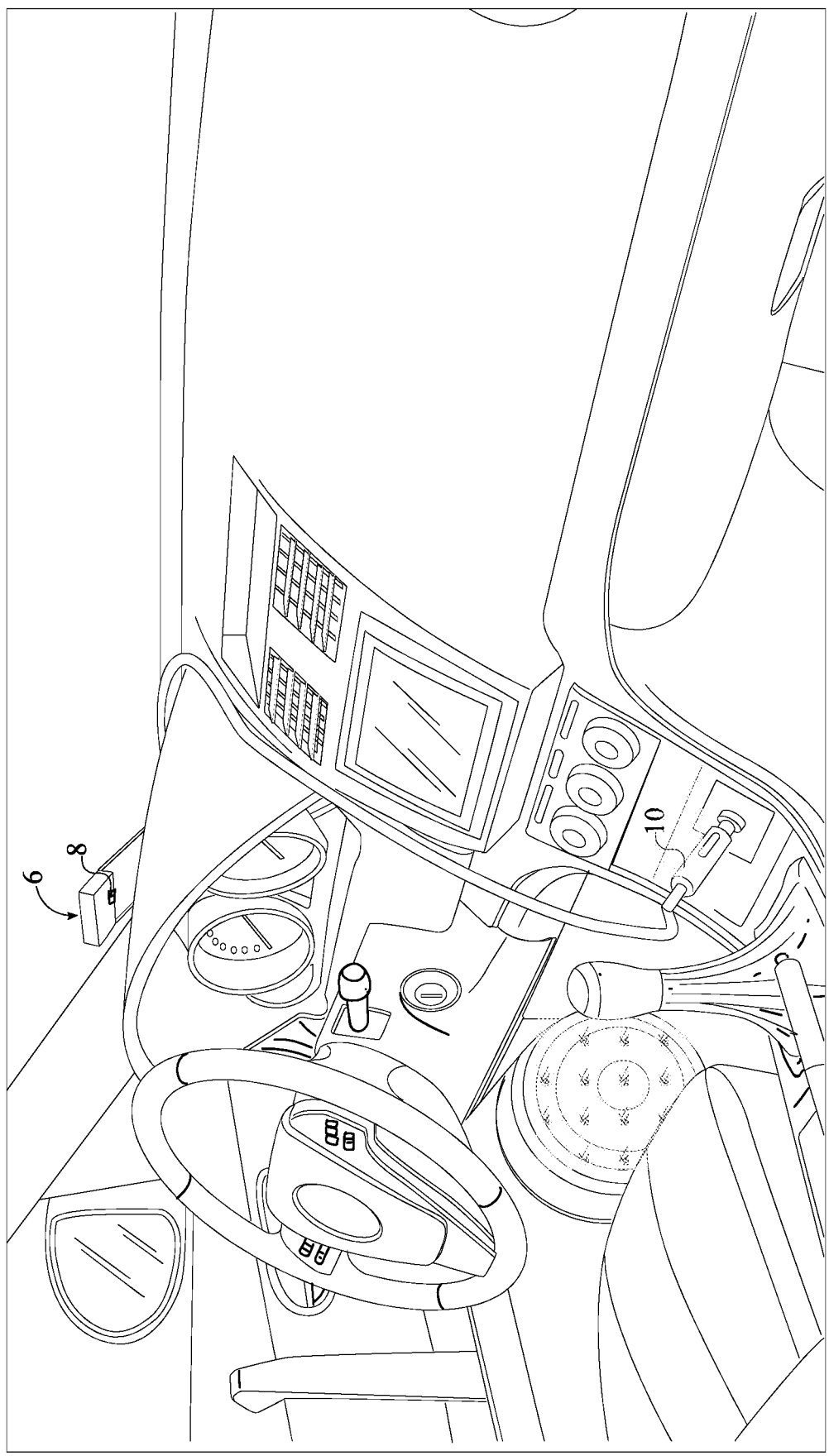
FIG. 11 shows the car charger connected to a power outlet or a cigarette lighter outlet of the car.
Figure 12:
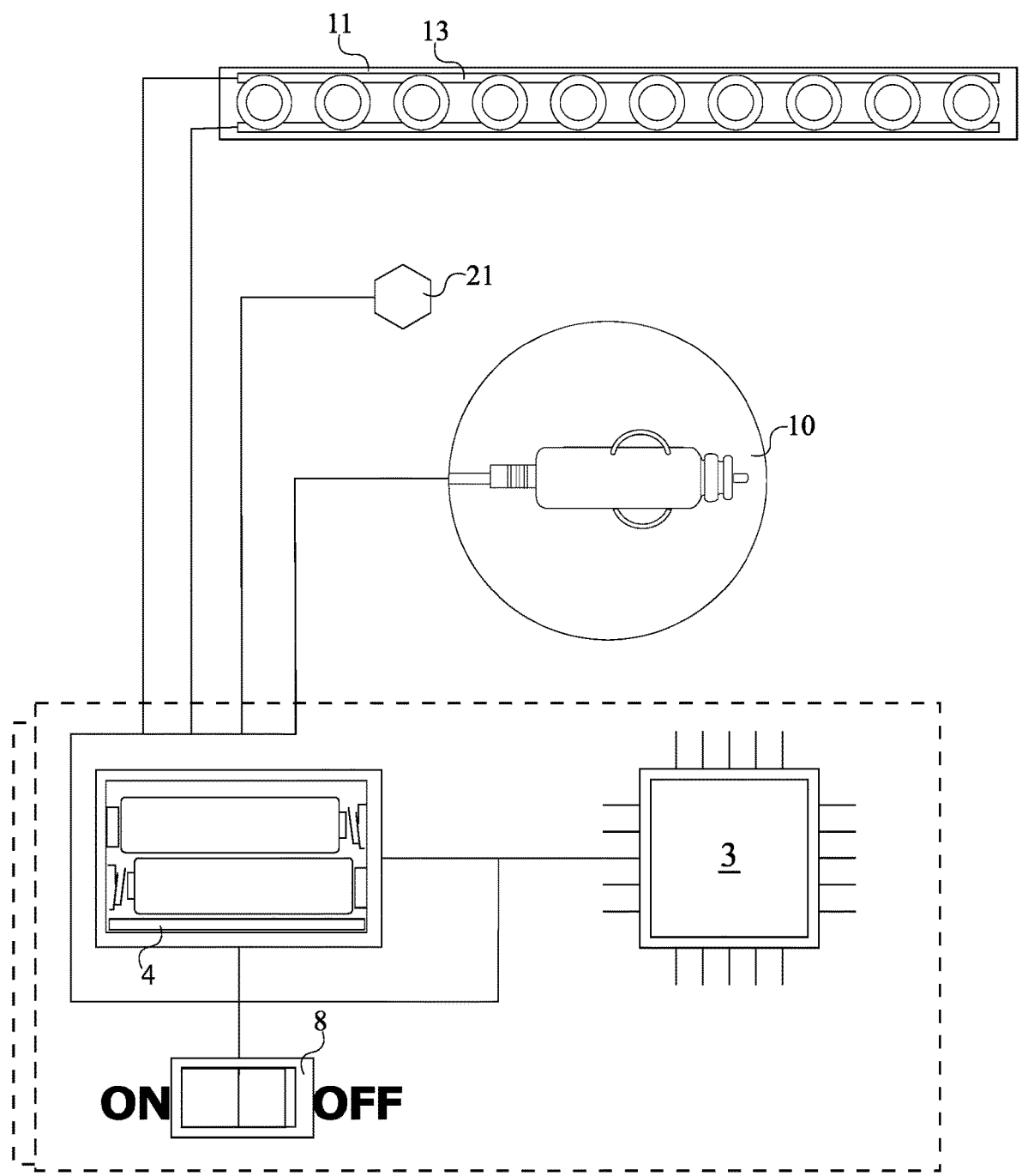
FIG. 12 is a schematic showing the electrical connections of the car charger.

Referring to FIG. 11, in addition to the solar panel 9, the preferred embodiment of the present invention further comprises a car charger 10. The car charger 10 can also recharge the power source 4 after each shock as the power source 4 utilizes a 3-volt rechargeable battery cell. As such, the car charger 10 is electrically connected to the power source 4. More specifically, the car charger 10 is a plug that inserts into a power outlet or a cigarette lighter outlet found on the car. As such, the car charger 10 utilizes the 12-volt battery system of the car to recharge the power source 4. The microcontroller 3 may be programmed to selectively connect the car charger 10 to prevent parasitic battery drain that reduces the capacity of the 12-bolt car battery.

Figure 14:
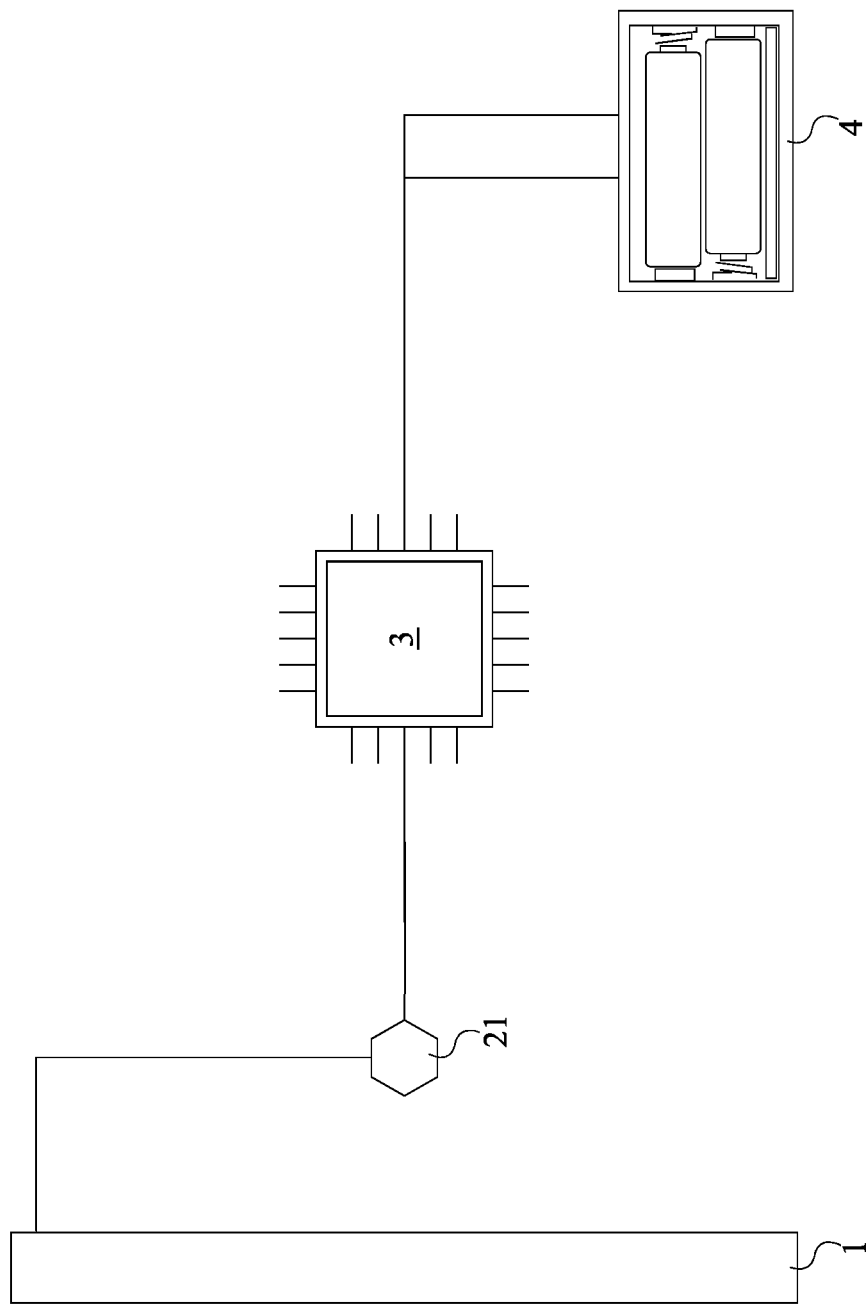
FIG. 14 is a schematic showing the electronic connection of the motion sensor.

Referring to FIG. 10 and FIG. 14, preferably, the sensor 2 is a motion sensor 21. The motion sensor 21 is terminally connected to the shock strip 1. More specifically, the connection between the motion sensor 21 and the substrate 11 may be enclosed by a protective enclosure. The motion sensor 21 is electrically connected to the power source 4. Similarly, the motion sensor 21 is also electronically connected to the microcontroller 3. More specifically, the motion sensor 21 is wired to both the power source 4 and the microcontroller 3. The wires connecting the motion sensor 21 to the power source 4 and the microcontroller 3 are enclosed by the protective enclosure. The protective enclosure also encloses at least two wires that connect the metal contact 13 to the power source 4. The two wires connect to the positive lead and the negative lead of the power source 4. By changing the charge of the positive lead in relation to the negative lead, an electrical circuit is formed thus forcing electrical current through the metal contact 13. As such, the motion sensor 21 transmits a signal when the bird is near the vicinity of the vehicle-side rear-view mirror 5 so that the power 4 is able to deliver the electric shock the metal contact 13 thus causing the bird to fly away from the vehicle-side rear-view mirror 5.

Figure 13:
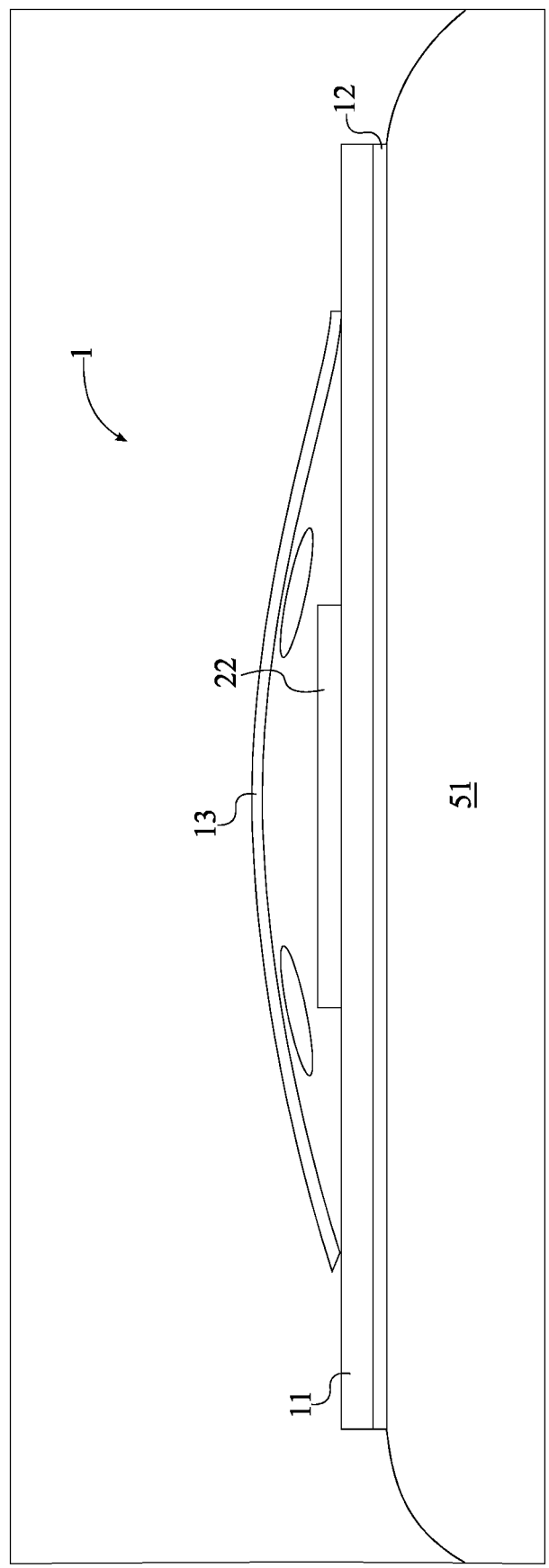
FIG. 13 is a side view of the shock strip showing the weight sensor mounted between the metal contact and the substrate.
Figure 15:
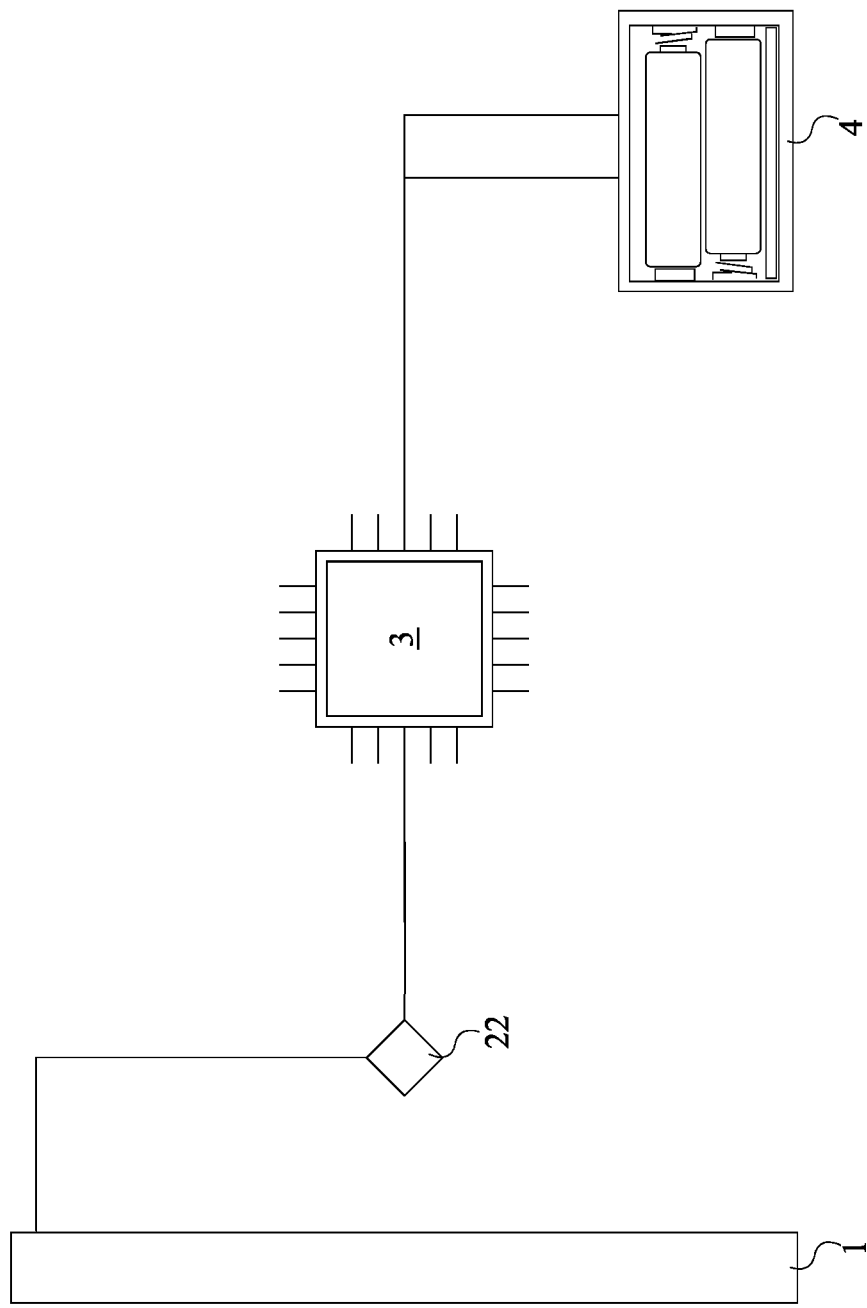
FIG. 15 is a schematic showing the electronic connection of the weight sensor.

Referring to FIG. 6, FIG. 13, and FIG. 15, in yet another embodiment of the present invention, the sensor 2 is a weight sensor 22. Unlike the motion sensor 21, the weight sensor 22 is connected in between the metal contact 13 of the shock strip 1 and the substrate 11 of the shock strip 1. The weight sensor 22 is electrically connected to the power source 4. Further, the weight sensor 22 is electronically connected to the microcontroller 3. More specifically, wires traverse through the protective enclosure and connect the weight sensor 22 to the power source 4 and the microcontroller 3. Similarly, an addition two wires may traverse through the protective enclosure connecting the metal contact 13. This allows an electrical shock to be delivered to the metal contact 13 through the power source 4. As such, the weight sensor 22 transmits a signal when the bird steps on the metal contact 13 so that the power 4 is able to deliver the electric shock through the metal contact 13 thus causing the bird to fly away from the vehicle-side rear-view mirror 5.

In an alternate embodiment of the present invention, the shock strip 1 may be configured to be attached anywhere about the vehicle or to a stationary structure such as a building. For example, the shock strip 1 may be positioned on the roof of a house to deter birds from defecating or damaging the roof.

Although the invention has been explained in relation to its preferred embodiment, it is to be understood that many other possible modifications and variations can be made without departing from the spirit and scope of the invention as hereinafter claimed.

What is claimed is:

1. A side-view mirror mounted bird deterrent system comprises:
    a shock strip;
    a sensor;
    a microcontroller;
    a power source;
    a vehicle-side rear-view mirror;
    the sensor being adjacently connected onto the shock strip;
    the shock strip being externally connected onto a frame of the side rear-view mirror;
    the shock strip, the sensor, and the microcontroller being electrically connected to the power source;
    the sensor and the power source being electronically connected to the microcontroller, wherein the sensor transmits a signal to the microcontroller when a bird is present within the vicinity of the shock strip;
    the sensor comprising a motion sensor or a weight sensor;
    the motion sensor being terminally mounted to the shock strip;
    the motion sensor being electrically connected to the power source;
    the motion sensor being electronically connected to the microcontroller;
    the weight sensor being connected in between a metal contact of the shock strip and a substrate of the shock strip;
    the weight sensor being electrically connected to the power source; and
    the weight sensor being electronically connected to the microcontroller.

2. The side-view mirror mounted bird deterrent system as claimed in claim 1 comprises:
    the vehicle-side rear-view mirror further comprises a mirror; and
    the mirror being mounted within the frame.

3. The side-view mirror mounted bird deterrent system as claimed in claim 1 comprises:
    the shock strip comprises a substrate, an adhesive strip, and a metal contact;
    the metal contact being adjacently connected onto the substrate;
    the adhesive strip being connected adjacent to the substrate, opposite of the metal contact;
    the substrate being attached to the frame by the adhesive strip; and
    the substrate being positioned along the vehicle-side rear-view mirror.

4. The side-view mirror mounted bird deterrent system as claimed in claim 3, wherein the metal contact is electrically connected to the power source.

5. The side-view mirror mounted bird deterrent system as claimed in claim 1 comprises:
    a housing;
    a fastening mechanism;
    a power button;
    the power source being positioned within the housing;
    the microcontroller being positioned within the housing;
    the power button being integrated into the housing; and
    the fastening mechanism being laterally connected onto the housing, opposite the power button.

6. The side-view mirror mounted bird deterrent system as claimed in claim 4 comprises:
    the power button being electrically connected to the power source, wherein the power button breaks the electrical connection from the power source to the shock strip, the microcontroller, and the sensor.

7. The side-view mirror mounted bird deterrent system as claimed in claim 1 comprises:
    a solar panel; and
    the solar panel being electrically connected to the power source.

8. The side-view mirror mounted bird deterrent system as claimed in claim 1 comprises:
    a car charger; and
    the car charger being electrically connected to the power source.

9. A side-view mirror mounted bird deterrent system comprises:
    a shock strip;
    a sensor;
    a microcontroller;
    a power source;
    a vehicle-side rear-view mirror;
    the vehicle-side rear-view mirror comprises a mirror;
    the sensor being adjacently connected onto the shock strip;
    the shock strip being externally connected onto a frame of the side rear-view mirror;
    the shock strip, the sensor, and the microcontroller being electrically connected to the power source;
    the sensor and the power source being electronically connected to the microcontroller, wherein the sensor transmits a signal to the microcontroller when a bird is present within the vicinity of the shock strip;
the mirror being mounted within the frame;
the sensor comprising a motion sensor or a weight sensor;
the motion sensor being terminally mounted to the shock strip;
the motion sensor being electrically connected to the power source;
the motion sensor being electronically connected to the microcontroller;
the weight sensor being connected in between a metal contact of the shock strip and a substrate of the shock strip;
the weight sensor being electrically connected to the power source; and
the weight sensor being electronically connected to the microcontroller.

10. The side-view mirror mounted bird deterrent system as claimed in claim 9 comprises:
the shock strip comprises a substrate, an adhesive strip, and a metal contact;
the metal contact being adjacently connected onto the substrate;
the adhesive strip being connected adjacent to the substrate, opposite of the metal contact;
the substrate being attached to the frame by the adhesive strip;
the substrate being positioned along the vehicle-side rear-view mirror; and
wherein the metal contact is electrically connected to the power source.

11. The side-view mirror mounted bird deterrent system as claimed in claim 9 comprises:
a housing;
a fastening mechanism;
a power button;
the power source being positioned within the housing;
the power button being integrated into the housing; and
the fastening mechanism being laterally connected onto the housing, opposite the power button.

12. The side-view mirror mounted bird deterrent system as claimed in claim 11 comprises:
the power button being electrically connected to the power source, wherein the power button breaks the electrical connection from the power source to the shock strip, the microcontroller, and the sensor.

13. The side-view mirror mounted bird deterrent system as claimed in claim 9 comprises:
a solar panel; and
the solar panel being electrically connected to the power source.

14. The side-view mirror mounted bird deterrent system as claimed in claim 9 comprises:
a car charger; and
the car charger being electrically connected to the power source.

* * * * *